United States Patent
Behroozpour et al.

(10) Patent No.: US 10,598,968 B2
(45) Date of Patent: Mar. 24, 2020

(54) TEMPERATURE FEEDBACK FOR ELECTRO-OPTIC PHASE-SHIFTERS

(71) Applicant: Robert Bosch GmbH, Stuttgart (DE)

(72) Inventors: Behnam Behroozpour, Foster City, CA (US); Pedram Lajevardi, Menlo Park, CA (US); Jan Niklas Caspers, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/217,501

(22) Filed: Dec. 12, 2018

(65) Prior Publication Data

US 2019/0227351 A1    Jul. 25, 2019

Related U.S. Application Data

(60) Provisional application No. 62/619,156, filed on Jan. 19, 2018.

(51) Int. Cl.
| | | |
|---|---|---|
| *G02F 1/025* | (2006.01) | |
| *G02F 1/015* | (2006.01) | |
| *G01K 7/01* | (2006.01) | |
| *H04B 10/50* | (2013.01) | |
| *G01S 17/08* | (2006.01) | |
| *G01S 7/497* | (2006.01) | |

(52) U.S. Cl.
CPC ............... *G02F 1/025* (2013.01); *G01K 7/01* (2013.01); *H04B 10/50* (2013.01); *G01S 7/497* (2013.01); *G01S 17/08* (2013.01); *G02F 2001/0154* (2013.01); *G02F 2203/50* (2013.01)

(58) Field of Classification Search
CPC ............ G02F 1/025; G02F 2001/0154; G02F 2203/50; G01K 7/01; H04B 10/50; G01S 7/497; G01S 17/08
See application file for complete search history.

(56) References Cited

U.S. PATENT DOCUMENTS

| | | | |
|---|---|---|---|
| 4,123,698 A | 10/1978 | Timko et al. | |
| 7,482,857 B2 * | 1/2009 | Song | H04B 1/0007 327/538 |
| 8,403,599 B2 | 3/2013 | Anzai | |
| 2017/0288781 A1 | 10/2017 | Carpentier et al. | |
| 2017/0315424 A1 * | 11/2017 | Celo | G02F 1/3136 |

OTHER PUBLICATIONS

"High-speed optical modulation based on carrier depletion in a silicon waveguide", Liu et al., 2007 Optical Society of America, Jan. 22, 2007 / vol. 15, No. 2 / Optics Express 660.

* cited by examiner

*Primary Examiner* — John Bedtelyon
(74) *Attorney, Agent, or Firm* — Maginot, Moore & Beck LLP

(57) ABSTRACT

A transmitter for an optical device includes semi-conductor waveguides, each incorporating an electro-optic phase-shifter in the semi-conductor waveguide that is operable to change the refractive index of the waveguide to thereby introduce a phase shift in the light propagated through the waveguide. The electro-optic is connected to a phase shift controller and to a temperature measurement component, such as a PTAT circuit, that is integrated into the electronic or photonic chip carrying the waveguide. Temperature measurement by the measurement component can be multiplexed with the normal operation of the phase-shifter so that the temperature measurement function does not interfere with the phase shifting function.

20 Claims, 3 Drawing Sheets

TEMPERATURE FEEDBACK FOR ELECTRO-OPTIC PHASE-SHIFTERS

PRIORITY CLAIM

This application is utility filing from and claims priority to U.S. Provisional Application No. 62/619,156, filed on Jan. 19, 2018, the entire disclosure of which is incorporated herein by reference.

BACKGROUND

For optical phased-arrays (OPAs), electro-optic phase-shifters are preferred for their performance metrics, such as lower power consumption and high speed. However, the performance of electro-optic phase-shifters can be affected at temperatures outside a preferred operating range because the voltage required to induce a desired phase shift is typical temperature dependent. Thus, depending on the material and the structure of the phase-shifters, ambient temperature variation can disturb the accuracy of an electro-optic phase-shifter. OPAs are often used in Lidar (light detection and ranging) devices and optical imaging devices including digital cameras, MRI, CT, and any suitable imaging devices where accuracy is important. Any minor deviation in the voltage required for a desired phase shift due to temperature can significantly compromise the performance of the camera or Lidar unless the applied voltage is adjusted. There is a need to avoid compromises in the performance of the components of these imaging devices and Lidar devices due to temperature, including the phase-shifter components. This disclosure provides a remedy for this problem with electro-optic phase-shifters that does not require any change to the process for fabricating the phase-shifter and that only uses electronic control circuitry.

SUMMARY OF THE DISCLOSURE

An optical device and method is provided for accounting for temperatures outside a preferred operating range in an optical phased-array using electro-optic phase-shifters. In particular, the devices and methods disclosed herein utilize existing contacts at the electro-optic phase-shifter in semi-conductor waveguides, which contacts are already connected to electronic or photonic chip circuitry for controlling the refractive index of the waveguide. In accordance with one feature of the disclosure, a temperature measurement component, such as a PTAT circuit, is integrated into the electronic or photonic chip and connected to the existing phase-shifter contacts. In a further feature, temperature measurement by the measurement component can be multiplexed with the normal operation of the chip and phase-shifter so that the temperature measurement function does not interfere with the phase shifting function.

DETAILED DESCRIPTION

Figure 1:
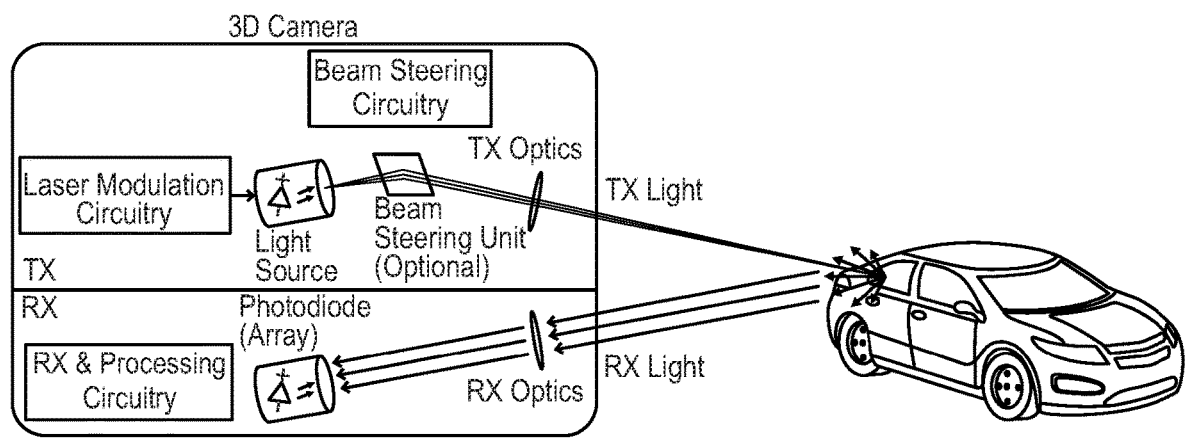
FIG. 1 is a diagram of an exemplary Lidar or 3D camera system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

The general architecture of a Lidar system or a 3D camera is shown in FIG. 1. The 3D camera includes a transmitter TX operable to modulate the amplitude of the light from a light source, such as a laser, into a series of pulses, in which the light is distributed to a scene using proper optical elements. The camera further includes a receiver RX in which the reflected light from the scene is collected and imaged onto a sensor array, such as a photodiode array on a CMOS chip. A time delay of the electrical waveform (e.g. photodiode current) generated by each of the sensor elements in response to the RX light, with respect to the original modulation waveform, in the TX light, is measured using electronic circuits, to determine a time-of-flight of the optical signal from the source TX to the receiver RX. In certain applications, the transmitter TX includes beam steering circuitry that controls the direction of the TX light, such as to scan a scene or object.

Figure 2:
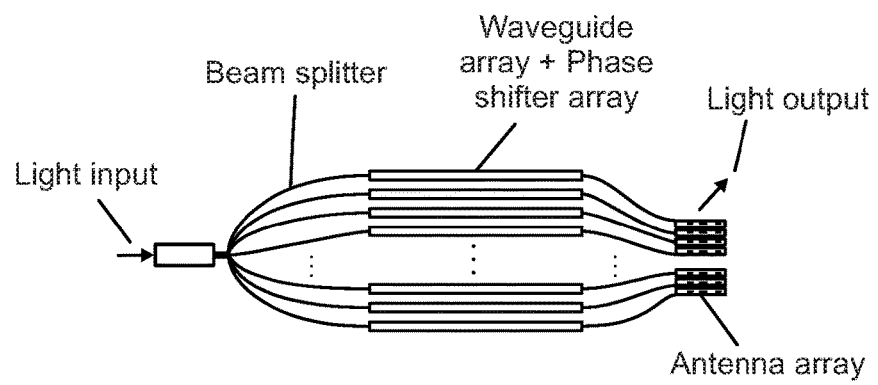
FIG. 2 is a schematic diagram of an exemplary transmitter, such as for use in a Lidar system.

FIG. 2 shows a schematic diagram of a transmitter in the Lidar or camera system shown in FIG. 1 (although other systems may use a similar system in other applications). The system includes a beam splitter, a waveguide array, a phase-shifter array and an antenna array, as is known in the art. The beam splitters are used to split one input light beam into multiple light beams that are propagated along multiple optical paths defined by the waveguides in the optical waveguide array. The phase-shifter array is typically built on the waveguide array platform to induce phase delays into certain ones of the propagating light beams. The antenna array couples the light beam from the solid-state Lidar to transmit toward the object or scene being observed. With the phase delays induced by the phase-shifter array, the output light beam can be steered into different angles, which allows the solid-state camera or Lidar to collect information from different directions.

Figure 3:
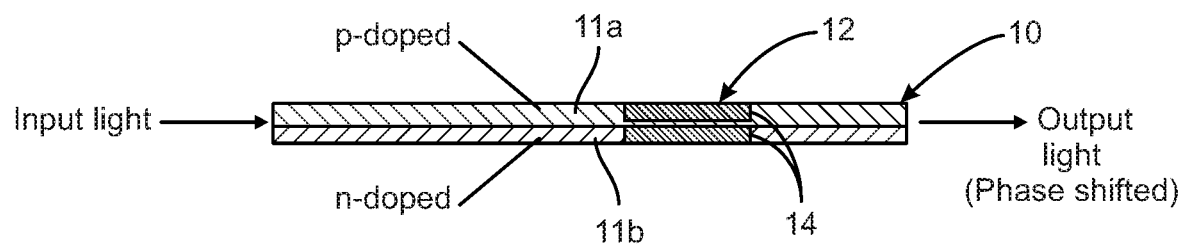
FIG. 3 is a diagram of an electro-optic phase-shifter used in the phase-shifter array for the system shown in FIG. 2.

In certain Lidar or 3D camera systems, the phase-shifter array includes electro-optic phase-shifters that operate based on the dependence of the refractive index of a material to the carrier concentration in the material. In one embodiment, an electro-optic phase-shifter 12 can take the form of a PN-junction in a semi-conductor waveguide 10, as shown in FIG. 3. The conventional phase-shifter of FIG. 3 includes a semiconductor waveguide 10 on a photonic semi-conductor chip that includes a p-doped semiconductor layer 11$a$ defining one side of the waveguide and an adjacent n-doped semiconductor layer 11$b$ defining the opposite side. The p-doped and n-doped layers 11$a$, 11$b$ of the semi-conductor waveguide each include electrical contacts 14 at the junction between the layers (PN-junction) for integrating the waveguide into electronic control circuitry, as known in the art. By applying a forward-bias current to the PN-junction and changing the level of the current, or by applying a reverse bias voltage to it and changing the level of the voltage, the concentration of the carriers at the PN-junction can be controlled, thereby altering the refractive index of the waveguide. Both of these methods—forward current or reverse voltage control—are commonly used in implementing electro-optic phase-shifters as disclosed in A. Liu, L. Liao, D. Rubin, H. Nguyen, B. Ciftcioglu, Y. Chetrit, N. Izhaky and M. Paniccia, "High-speed optical modulation based on carrier depletion in a silicon waveguide," *Optics Express*, vol. 15, no. 2, pp. 660-668, 2007, the entire disclosure of which is incorporated herein by reference.

However, such phase-shifters are susceptible to thermal fluctuation on the waveguide medium which can result in a significant effect on its refractive index and its overall performance. One way to address this problem is to measure the temperature of the waveguide and compensate for its thermal fluctuations by varying the control voltage or current applied to the waveguide in relation to the deviation of the waveguide temperature form a baseline temperature. In typical electronic systems and integrated circuits design, temperature measurement is performed by means of a so called proportional-to-absolute-temperature (PTAT) circuit, such as described in M. P. Timko, "A Two-Terminal IC Temperature Transducer," *IEEE Journal of Solid-State Circuits*, Vols. SC-11, no. 6, pp. 784-788, 1976, the entire disclosure of which is incorporated herein by reference. These prior circuits rely on the I-V curve of a diode being a function of its junction temperature, namely:

$$I_{diode} = I_0 e^{-\frac{V_{diode}}{k_B T/q_e}},$$

where $I_{diode}$ is the diode current, $V_{diode}$ is the diode voltage, $k_B$ is the Boltzmann constant, $q_e$ is the electron charge and T is the absolute temperature in Kelvin. The PTAT can generate a signal or magnitude that can be compared to a reference signal or magnitude to, in effect, determine a temperature difference of the circuitry relative to a baseline temperature. This temperature difference can be used to calibrate the voltage or current applied to the PN-junction to provide the desired phase-shift. Exemplary PTAT devices include the AD590 series of surface mount temperature transducers sold by Analog Devices, Inc., or devices disclosed in U.S. Pat. No. 4,123,698, issued to Michael Timko on Oct. 31, 1978, and U.S. Pat. No. 8,403,559, issued on Mar. 26, 2013 to Seiko Instruments, Inc., the disclosures of which are incorporated herein by reference. Certain PTAT devices operate as a calibrated temperature-dependent current source so that the output current is indicative of the temperature differential relative to a baseline temperature for the waveguide or PN-junction.

In order to use such a technique to measure the temperature of a phase-shifter, a diode is placed on the photonic chip, in proximity of the waveguide, so that its I-V curve can be used to measure the local temperature close to the phase-shifter. However, this approach can be problematic. Firstly, in applications such as optical phased arrays (OPAs), it is desirable to place the phase-shifters in close proximity of each other to ensure correlation between the phase shift each phase-shifter induces to the corresponding light beam when the same voltage or current is applied to phase-shifters. Moreover, in most applications of OPAs there is a space requirement for the chip-mounted devices so the phase-shifters and other components are packed as close together as possible, meaning that there is no space left for additional components. Placing a diode for temperature measurement close to the phase-shifter together separate contact pads to connect the diode and the phase-shifter to an electronic control chip makes it difficult to meet this constraint. Secondly, for an array with thousands of phase-shifters as might arise in a system for visualizing an entire scene, a diode dedicated to each phase-shifter would double the number of the connections between the photonic and electronic chips, which can be a critical factor in the cost of the overall system.

Figure 4:
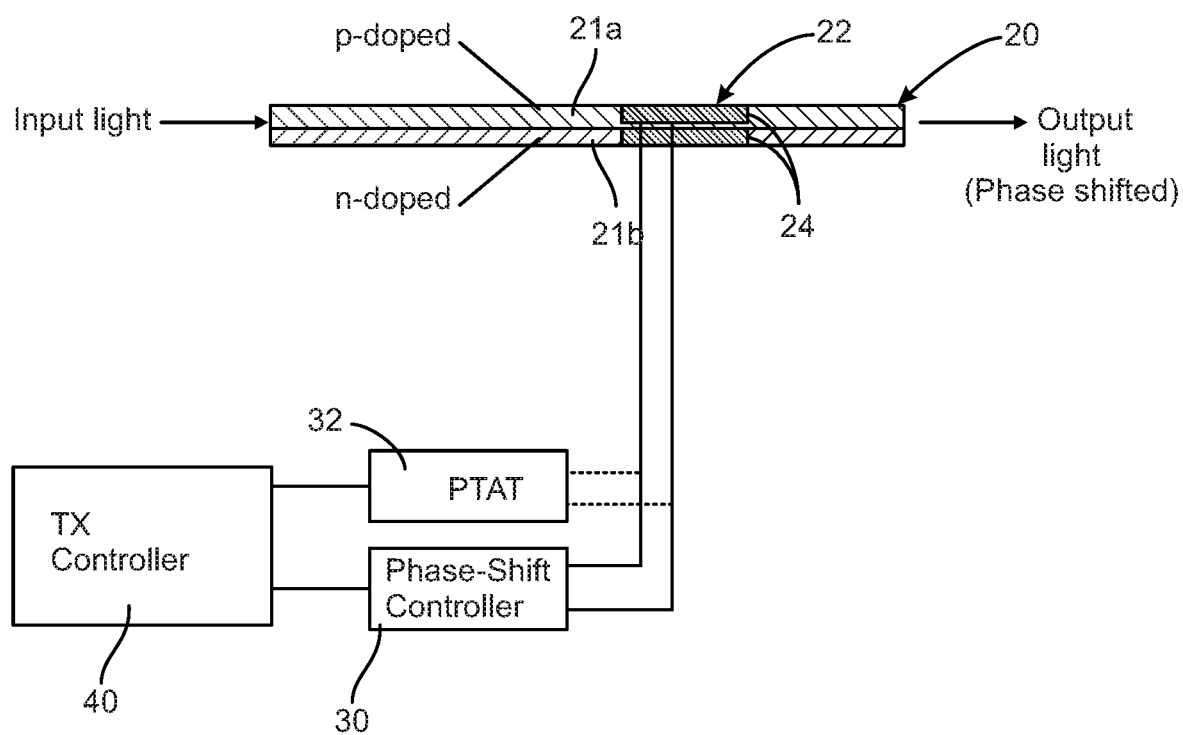
FIG. 4 is a diagram of an electro-optic phase-shifter incorporating a PTAT according to one embodiment of the present disclosure.

According to the present disclosure, the PN-junction of the phase-shifter itself is used to measure the temperature, rather than a separate diode. In accordance with the present disclosure, a semi-conductor waveguide 20 is formed by a p-doped semiconductor layer 21a and an n-doped semiconductor layer 21b, and includes a phase-shifter 22 at the PN-junction between the layers, as shown in FIG. 4. Contacts 24 at the PN-junction are connected to a phase shift controller 30 that is operable to control the current or voltage at the PN-junction, to thereby control the phase shift within the waveguide 20. The phase shift controller can be in the form of a conventional semiconductor circuit on an electronic or photonic chip, such as the circuit disclosed in the Liu article incorporated by reference above, or a circuit as disclosed in U.S. Published Application No. 2017/0288781, published on Oct. 5, 2017 in the name of ST Microelectronics SA.

In one aspect of the present disclosure, the contacts 24 at the PN-junction are also connected to a temperature detection component 32 on the electronic chip to determine its temperature, as depicted in FIG. 4. The temperature detection component can be a PTAT circuit constructed as discussed above so that the PN-junction is, in effect, being used as a diode.

When the phase-shifter is in a normal operating mode, the desired reverse voltage or forward current can be applied by a phase shift controller 30 to control the refractive index of the waveguide, and thus the phase shift of the light propagated through the waveguide. In one aspect of the present disclosure, the normal operation of the phase shift controller 30 is interrupted at predetermined intervals for a predetermined period to use the PN-junction for temperature measurement by the PTAT circuit 32. The timing and duration of this interruption can be based on the dynamics of the temperature behavior in a particular system. Since the electrical contacts 24 of the PN-junction are already connected to the phase shift controller 30 for providing phase-shift control during normal operation, connecting the PN-junction to the PTAT circuit 32 can be implemented with virtually no change to the photonic chip, i.e., without adding extra diodes or connection pads to the chip.

The transmitter TX (FIG. 1) can incorporate a controller 40 that is connected to the PTAT circuit 32 and the phase shift controller 30. The TX controller 40 is operable in a temperature detection mode to interrupt the phase shift controller and to activate the PTAT circuit to determine the temperature, relative temperature, or temperature differential, at the particular PN-junction. The TX controller re-activates the phase shift controller after a predetermined period sufficient for the temperature detection component to detect the PN-junction temperature. The TX controller can include circuitry and/or software operable to interpret the PTAT signal and determine any change required to the voltage or current applied to the PN-junction by the phase shift controller to achieve the desired refractive index for the associated waveguide and corresponding phase shift of the light propagated through the associated waveguide. The TX controller 40 is thus configured and operable to activate and control the phase shift controller 30 to apply the temperature-modified voltage or current to the PN-junction of the phase-shifter 22 so that the appropriate phase shift is applied to the waveguide 20.

The temperature measurement can be performed at any rate necessitated by the thermal behavior of the particular system. For instance, if a system tends to have considerable thermal fluctuations at a rate of 1 kHz, then the TX Controller 40 can be configured to active the PTAT circuit 32 to conduct the temperature measurement at a rate of 2 kHz or higher to ensure capturing the possible temperature changes. The duration of the temperature measurement depends on the electronic circuit used and on the desired precision, while being kept appropriately short to avoid disturbing the normal operation of the phase-shifter. In one specific embodiment the TX controller 40 is configured to interrupt the phase shift controller for 1-5 μsec during which time the temperature detection component 32 is activated and the temperature measurement obtained.

In other embodiments in which the phase shift controller 30 applies a forward bias current to the PN-junction of the phase-shifter 22, the temperature measurement can be conducted simultaneous with the normal operation of the phase-shifter without interrupting its function. The temperature measurement in this embodiment can be continuous, like the operation of the phase shift controller, or can be periodic, as discussed above.

Figure 5:
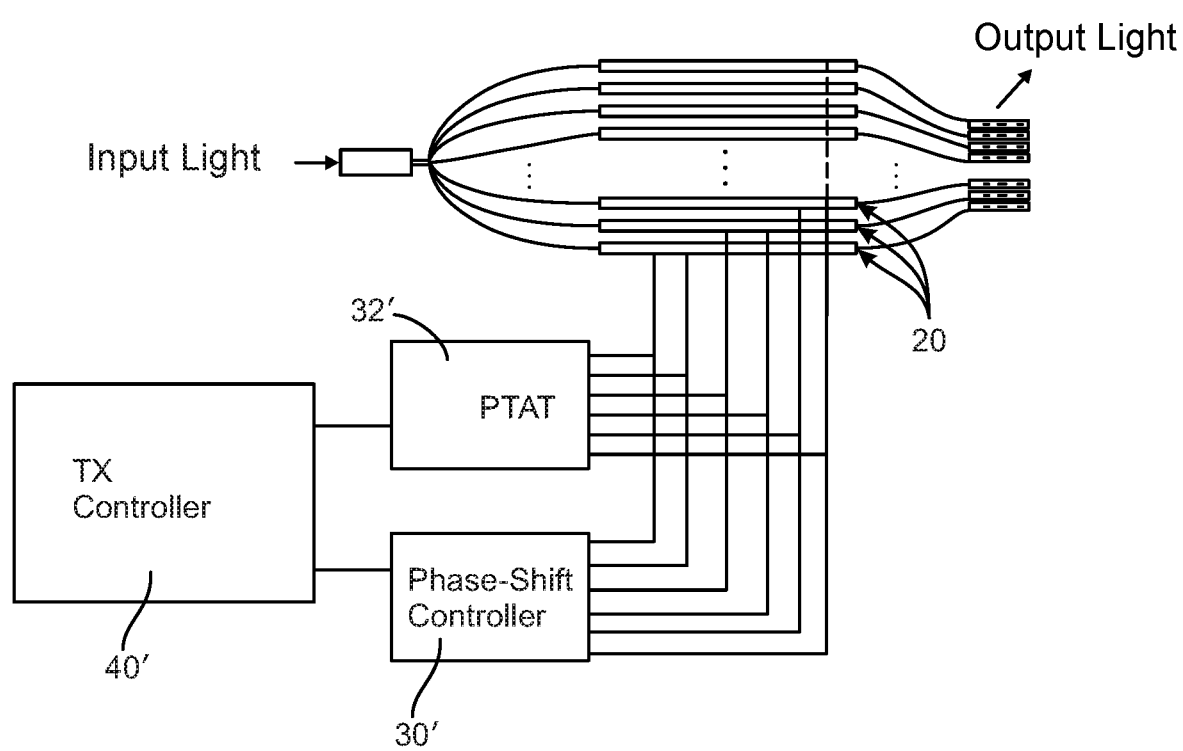
FIG. 5 is a diagram of the electro-optic phase-shifter of the present disclosure incorporated into the exemplary transmitter shown in FIG. 2.

For applications like OPA where multiple phase-shifters operate together, the PTAT circuit used for temperature measurement on the electronic or photonic chip can be connected to multiple phase-shifter elements as depicted in FIG. 5 and operated using time multiplexing. As shown in FIG. 5, several waveguides 20 are connected to a temperature detection component 32' and to a phase shift controller 30'. In one embodiment, the TX controller 40' is configured to multiplex the phase shift controller to control the voltage or current applied to the PN-junction of each of the waveguides. Alternatively, a separate phase shift controller 30' may be provided for each waveguide. In one aspect of this embodiment, the TX controller 40' is configured to multiplex the PTAT 32' to measure the temperature at the PN-junction of each of the waveguides 20, with the temperature measurement interleaved between operations of the phase shift controller, as discussed above. As explained above, in the temperature detection mode, the TX controller 40' can interrupt the phase shift controller 30', whether a single phase shift controller for the plurality of waveguides or a dedicated phase shift controller for each waveguide, and activate the single temperature detection component or PTAT 32'.

In a further embodiment where the temperature of the adjacent phase-shifters, for example in an OPA, are very close, the circuit architectures that rely on multiple PN-junctions for temperature measurement can be used by connecting the adjacent phase-shifters to the same PTAT circuit, as discussed in the Timko reference incorporated by reference above.

The present disclosure should be considered as illustrative and not restrictive in character. It is understood that only certain embodiments have been presented and that all changes, modifications and further applications that come within the spirit of the disclosure are desired to be protected.

For example, the temperature measurement circuit discussed above is connected to the electrical contacts at a PN-junction of the electro-optic phase-shifter in the semiconductor waveguide. However, other forms of waveguide phase-shifters are contemplated that utilize a doped semiconductor material, such as doped silicon. The electro-optic phase shifter can utilize multiple doped regions with multiple electrical contacts to those regions. It is contemplated that the multiple doped regions can include at least one that is p-doped and one that is n-doped. The present disclosure contemplates using the existing electrical contacts, which are provided for connecting the electro-optic phase shifter to phase-shift circuitry, as electrical contacts for the temperature measurement circuit. In phase-shifters that utilize multiple doped regions, the temperature measurement circuit can be connected to the electrical contacts for one or more of those regions. The use of the existing electro-optic phase-shifter for temperature measurement according to the present disclosure is not limited to specific phase-shifter geometries, but instead only requires common electrical contacts to doped semi-conductor regions used by the electro-optic phase-shifter.

What is claimed is:

1. An optical transmitter comprising:
   a light source;
   a waveguide connected to the light source to receive light therefrom, the waveguide configured to propagate the light to an output;
   a phase-shifter incorporated in said waveguide that is controllable to change the refractive index of the waveguide at the phase-shifter, the phase-shifter including electrical contacts;
   a phase shift controller electrically connected to the phase-shifter at the electrical contacts and operable to control the current and/or voltage applied to said phase-shifter to change the refractive index; and
   a temperature detection component electrically connected to the phase-shifter at the same electrical contacts and operable to generate a signal indicative of the temperature of the phase-shifter.

2. The optical transmitter of claim 1, wherein said temperature detection component is a proportional-to-absolute-temperature (PTAT) circuit.

3. The optical transmitter of claim 1, further comprising a controller connected to said phase shift controller and said temperature detection component and operable to adjust the current and/or voltage applied by the phase shift controller to the phase-shifter as a function of the signal generated by the temperature detection component.

4. The optical transmitter of claim 3, wherein said controller is configured and operable in a temperature detection mode to interrupt the operation of the phase shift controller and activate the temperature detection component while the phase shift controller is interrupted.

5. The optical transmitter of claim 4, wherein said controller is configured and operable in said temperature detection mode for a predetermined period.

6. The optical transmitter of claim 4, wherein said controller is configured and operable in said temperature detection mode at predetermined intervals during the operation of the phase shift controller.

7. The optical transmitter of claim 6, wherein said controller is configured and operable in said temperature detection mode for a predetermined period at said predetermined intervals.

8. The optical transmitter of claim 3, wherein said controller is operable in a temperature detection mode to activate the temperature detection component without interrupting the operation of the phase shift controller.

9. The optical transmitter of claim 8, wherein:
said phase-shifter of said waveguide includes a PN-junction; and
said electrical contacts are at said PN-junction.

10. The optical transmitter of claim 1, further comprising:
a beam splitter receiving light from said light source, said beam splitter splitting the light to a plurality of waveguides, each of said plurality of waveguides including said phase-shifter and said electrical contacts at the PN-junction, wherein said phase shift controller is electrically connected to the electrical contacts of each of said plurality of waveguides and said temperature detection component is a single temperature detection component electrically connected to the electrical contacts of each of said plurality of waveguides.

11. The optical transmitter of claim 10, further comprising a controller connected to said phase shift controller and said temperature detection component and operable in a temperature detection mode to interrupt the operation of the phase shift controller and to activate the temperature detection component while the phase shift controller is interrupted.

12. The optical transmitter of claim 11, wherein said controller is operable in said temperature detection mode to multiplex said temperature detection component between the phase shifters of each of said plurality of waveguides.

13. A waveguide for connection to a light source to receive light therefrom, comprising:
a p-doped semiconductor layer and an n-doped semiconductor layer configured to propagate light to an output;
a phase-shifter incorporated at a PN-junction between the semiconductor layers, the phase-shifter configure to change the refractive index of the waveguide at the phase-shifter, the phase-shifter including electrical contacts at the PN-junction;
a phase shift controller electrically connected to the phase-shifter at the electrical contacts and operable to control the current and/or voltage applied to said PN-junction of the phase-shifter to change the refractive index; and
a temperature detection component electrically connected to the phase-shifter at the same electrical contacts and operable to generate a signal indicative of the temperature of the phase-shifter at said PN-junction.

14. The waveguide of claim 13, wherein said temperature detection component is a proportional-to-absolute-temperature (PTAT) circuit.

15. The waveguide of claim 13, further comprising a controller connected to said phase shift controller and said temperature detection component and operable to adjust the current and/or voltage applied by the phase shift controller to the PN-junction as a function of the signal generated by the temperature detection component.

16. The waveguide of claim 15, wherein said controller is configured and operable in a temperature detection mode to interrupt the operation of the phase shift controller and activate the temperature detection component while the phase shift controller is interrupted.

17. The waveguide of claim 16, wherein said controller is configured and operable in said temperature detection mode for a predetermined period.

18. The waveguide of claim 17, wherein said controller is configured and operable in said temperature detection mode at predetermined intervals during the operation of the phase shift controller.

19. The waveguide of claim 18, wherein said controller is configured and operable in said temperature detection mode for a predetermined period at sad predetermined intervals.

20. The waveguide of claim 15, wherein said controller is operable in a temperature detection mode to activate the temperature detection component without interrupting the operation of the phase shift controller.

* * * * *